July 7, 1959 R. F. CHAPMAN 2,894,187

SYNCHRONIZATION OF MOTOR ROTATED ELEMENTS

Filed July 9, 1956

INVENTOR
RICHARD F. CHAPMAN
BY Percy P. Lantzy
ATTORNEY

United States Patent Office 2,894,187

Patented July 7, 1959

2,894,187

SYNCHRONIZATION OF MOTOR ROTATED ELEMENTS

Richard F. Chapman, Glendale, N.Y., assignor to International Telephone and Telegraph Corporation, Nutley, N.J., a corporation of Maryland Application July 9, 1956, Serial No. 596,765

7 Claims. (Cl. 318—71)

Figure 1:
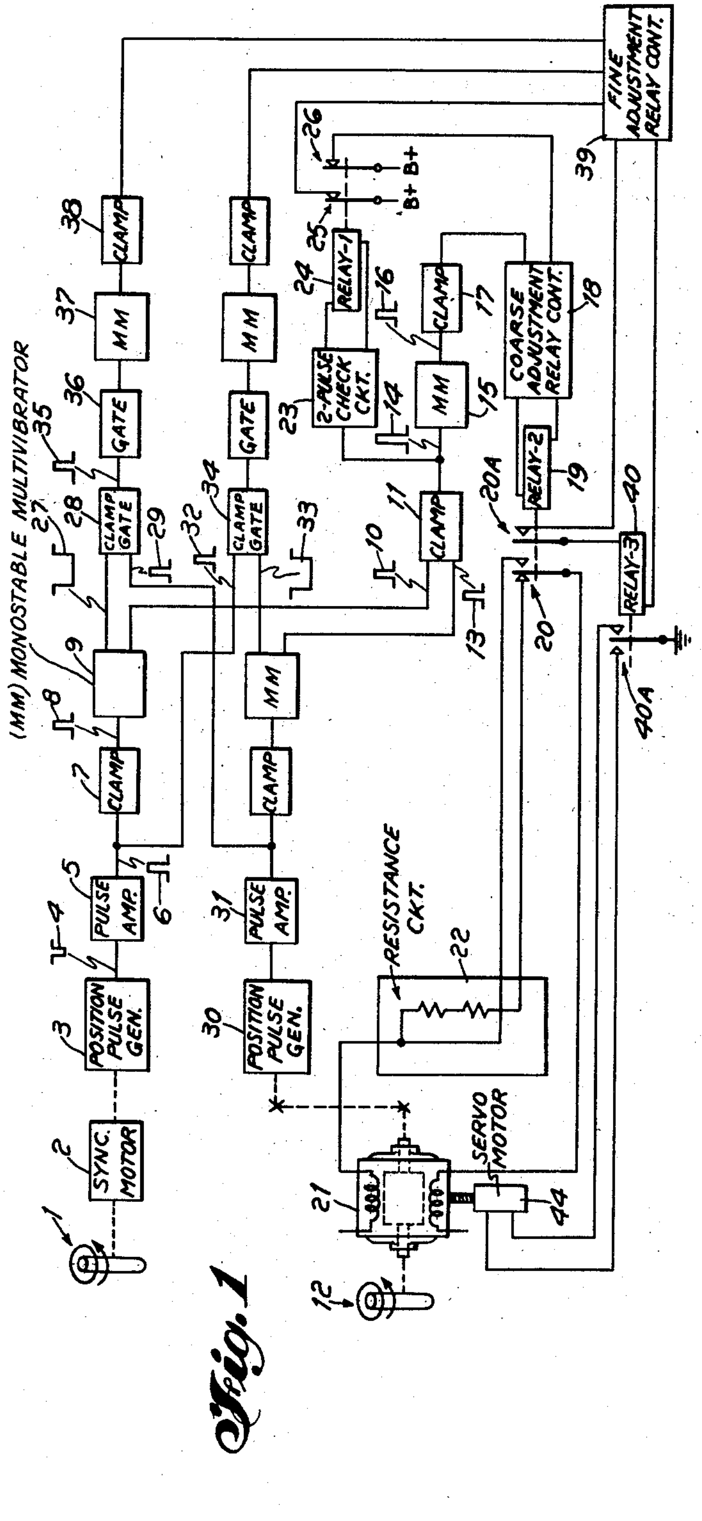

This invention relates to an apparatus for accurate synchronization of two or more rotating elements in a system where such accurate synchronization is a necessary part for the proper functioning of the system and in particular this invention relates to a system wherein the rotating elements are remotely located from each other.

Systems for synchronizing two rotating elements have been used extensively in the plan position indicator type radar system, where the sweep deflection coils of the cathode ray tube at the indicating location are rotated in synchronization with the scanning antenna of the transmitter station. Another application of two-element synchronization is found as used in direction finder equipment where the goniometer at the antenna position and the sweep deflection coils of a cathode ray tube are directly coupled to the same motor. This second application, however, presents serious limitations when it becomes necessary to locate the indicating station at some remote point from the antenna location. In the radar systems of the ground control approach variety, some systems have been developed to enable the placement of a monitor or indicating station at some remote distance from the location of the antenna. These radar systems have generally used the principle of transmitting a modulated signal, either amplitude or frequency modulated, which has been generated during the rotation of the antenna and, therefore, has a modulated value representative for every azimuth position of the antenna. These modulated signal systems have an inherent undesirable aspect in that the rotating element of the indicating station must be continually driven by the synchronizing signal as interpreted by the demodulating equipment at the indicating station and, therefore, any irregularity of the components of the demodulating equipment might reflect an inaccurate synchronization. Such a contigency gives rise to the addition of a check circuit in the systems to insure against irregularity and hence creates a somewhat critical system.

It is therefore, an object of this invention to provide a noncritical synchronization system of rotating elements whose rotating driving devices are merely corrected and not driven by the synchronizing signal.

It is a further object of this invention to provide a rapid and accurate synchronization of the rotating elements by means of the coarse and fine adjustment features.

The above and other objects are accomplished by first having the synchronous motor at the antenna station of the same design as the synchronous motor at the indicating station. Ideally, once both motors have obtained synchronization, they could run independently and in synchronization. This type of performance is not feasible, of course, because of the inherent difference in motor design and the probable differences in power sources at the two remote locations; however, because of the independence of the driving sources, the system relies on the synchronizing signal for correction only and not for driving the rotating element so that the synchronization system becomes less critical when used as in this invention as compared with the conventional modulated signal synchronization system.

The incorporation into the system coarse and fine synchronization adjustment circuits permits the two motors to arrive at accurate synchronization rapidly. The coarse adjustment circuit compares positive identifying pulses from the two motors and causes one motor to "slip" thus passing one motor through large angular travel rapidly to seek the other motor's position. Having obtained the approximate position of the first motor and no longer "slipping," the motors will be rotating in close synchronization and the fine synchronization adjustment circuit is brought into operation to physically move in a vernier like fashion the stator of one of the motors until very precise accuracy of synchronization is realized.

Figure 2:
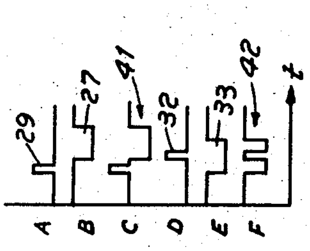
Figure 3:
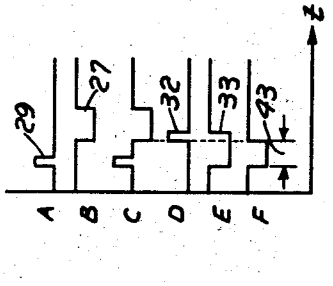

For a better understanding of the invention, reference may be had to the following detailed description to be read in connection with the accompanying drawing; in which Fig. 1 is a block diagram of the synchronizing system in accordance with the invention; and Figs. 2 and 3 are explanatory pulse diagrams for the system of Fig. 1.

In Fig. 1 of the drawing, the rotating element 1 is driven by the synchronous motor 2. The position pulse generator 3 is coupled to the end of the motor 2 opposite the rotating element 1 by way of illustration. The position pulse generator produces a very narrow negative pulse which is always produced when the rotor of the motor 2 is in a predetermined position. The negative pulse as shown at 4 is passed on to the pulse amplifier 5 where the pulse is amplified as a positive pulse 6. The positive pulse 6 as shown is passed to two parallel paths. The first path takes the pulse to clamp 7 which clamps the pulse to a predetermined voltage level. The operation of a clamp is described on pages 644 to 647 of the text "Electronic and Radio Engineering," fourth edition, by F. Terman, published by McGraw-Hill, 1955. The positive pulse as shown at 8 is passed to the monostable multivibrator 9 to produce simultaneously the negative gate pulse 27 and the positive pulse 10. The positive pulse 10 is tapped from the non-conducting side of monostable multivibrator 9 and passed to clamp 11. A circuit identical in design to the circuit described above is coupled to the second rotating rotating element 12. The resulting positive pulse 13 as generated in a manner identical to that described above is also passed to clamp 11. If there is coincidence of the pulses 10 and 13, then a pulse 14 of twice the magnitude of either pulse 10 or 13 is passed on to monostable multivibrator 15. The monostable multivibrator 15 has a predetermined threshold level which requires a pulse of the magnitude of pulse 14 to cause conduction on the normally non-conducting side. In effect, monostable multivibrator 15 becomes the determining point for coincidence of the two positive pulses. Individually the pulses 10 or 13 would not cause monostable multivibrator 15 to conduct on the non-conducting side. Assuming coincidence, a positive pulse 16 is passed to clamp 17 which clamps the pulse to a predetermined voltage level. The positive pulse continues to the coarse adjustment relay control circuit which keeps relay 19 energized as long as there is coincidence of pulses 10 and 13. As relay 19 is energized, relay points 20 and 20A are transferred; the latter points serve to insure the coarse adjustment action before the fine adjustment action which will become apparent later in the discussion. With relay 19 energized and relay point 20 transferred, there is cut from the fields of synchronous motor 21 the resistance circuit 22. It follows that, if there is no coincidence of pulses 10 and 13, the relay points 20 are not transferred and resistance circuit 22 will be in the field circuit of synchronous motor 21 which will cause a slipping action of the synchronous motor 21. The slipping operation constitutes the coarse synchronization adjustment of the system and rapidly moves the synchronous motor 21 to close synchrononization with synchronous motor 2. Monostable multivibrator 15 is not biased for a critical cutoff in accordance with the aforementioned object of the invention to obtain a non-critical system.

Returning momentarily to pulses 10 and 13, these pulses are simultaneously passed to the two-pulse check circuit 23. The components of check circuit 23 are so designed as to give a time constant response capable of detecting two position indicating pulses irrespective of when they occur within a cycle. This can be accomplished in many known ways, for example, by coupling an amplifier whose threshold level is the average value of the two pulses to a gating circuit whose output is coupled to energize the relay 24 or by connection an RC circuit to the cathode of an amplifier such that the average value of two pulses would keep the amplifier cutoff while one pulse or none would enable the amplifier to conduct and energize a relay connected thereto. As the two pulses are detected, the check circuit 23 will serve to keep the relay 24 deenergized and thus not cut out the B+ source to the adjustment circuits. A failure to detect two pulses which could mean a failure of the motor to rotate will cause relay 24 to be energized and open the points 25 and 26 thus cutting out the B+ source to the adjustment circuit and preventing any erroneous operation.

Returning now to the monostable multivibrator 9, we find a negative gating pulse 27 tapped from the normally non-conducting side of the monostable multivibrator 9 which has been conditioned to conduct by the pulse 8. This gating pulse is passed to clamp 28. Also to clamp 28 there is passed a positive pulse 29 which is generated by the positive pulse generator 30 in connection with the pulse amplifier 31. When the clamp gate 28 is conditioned by the negative gate pulse 27, any other incoming pulses are clamped to the negative voltage level of the negative gate pulse 27. Simultaneously because of the symmetrical circuitry positive pulse 32 and negative gate pulse 33 are passed to clamp 34. If there is coincidence of pulses 27 with 29 and 32 with 33, there are no pulses passed beyond either clamp 28 or 34 since the positive pulses are clamped to the negative gate voltage level. To better illustrate this fine adjustment circuit, however, let us assume noncoincidence of pulses 27 and 29 with the positive pulse 29 leading the negative pulse 27. Clamp 28 not being first or simultaneously conditioned by the negative gate pulse will pass the positive pulse which appears at 35. The pulse at 35 is shaped and amplified by means of the gate 36, monostable multivibrator 37 and clamp 38 and passed to relay control circuit 39. The relay control circuit 39 energizes the polarized relay 40 through relay point 20A which insures that the fine adjustment action takes place after the coarse adjustment.

The circuit is designed to provide that only one positive position pulse is passed to relay control circuit 39 and can be understood by referring to Figs. 2 and 3. In Fig. 2, pulses 29 and 27 are shown as they appear at clamp 28 under the conditions of our assumption and it can be seen that the output would be a pulse resembling pulse 41. However, since the clamp 28 only passes positive pulses, a positive pulse as shown at pulse 35 of Fig. 1 is the output that actually results. At the time that pulses 29 and 27 are presented to clamp 28, pulses 32 and 33 are also presented to clamp 34 and these pulses are shown in the same time relation in Fig. 2 as are pulses 29 and 27. The negative and positive pulses from the same sources have the same starting point and, therefore, negative pulse 33 has the same starting point as positive pulse 29 since both originate at the position pulse generator 30. In like manner pulses 29 and 32 have the same starting point. As can be seen from Fig. 2 when pulses 32 and 33 are presented together, pulse 32 is cancelled and pulse 33 is partially cancelled with the output resembling pulse 42. Again since clamp 34 only passes a positive pulse there is no pulse passed because pulse 42 does not have a positive characteristic. Fig. 3 is the extreme of the pulse presentation showing that if pulse 32 went timewise beyond the end of pulse 33 it is conceivable that two positive pulses both 29 and 32 could get through to relay control unit 39, however the circuit is designed to prevent this contingency. The time expense shown at 43 of Fig. 3 represents the total time adjustment which the fine adjustment circuit is capable of effecting. If there need be more degrees of fine adjustment, then the negative pulses 33 and 27 would be widened to always insure that one of the positive pulses would be cancelled and in actual practice if a condition occurred where pulse 32 went beyond 33 the coarse synchonous motor would operate. It follows that only one position pulse can pass to the relay control circuit 39.

Returning now to the polarized relay 40 which has been energized, we find relay points 40A transferred and the rotational intelligence voltage applied to the servo motor 44. The servo motor 44 drives the stator of synchronous motor 21 through a small arc in the proper direction until the pulse 29 no longer leads the negative pulse 27 and hence a fine synchronization is obtained.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for synchronizing rotating elements comprising first and second rotating elements, first and second synchronous motors to respectively drive said elements, said second motor having a rotor and a stator wherein the stator is rotatably adjustable, first and second position pulse generating devices responsive respectively to said first and second motor rotor positions in order to produce position indicative pulses thereof, a coarse synchronization adjustment circuit to effect a slipping operation of said second motor, a fine synchronous adjustment circuit to effect rotatable adjustment of said stator, a two-pulse check circuit connected in the system and designed to detect the presence of two position indicating pulses during a normal cycle of either of said synchronous motors and in the absence thereof capable of removing each of said coarse and fine adjustment circuits from the system, parallel circuitry means to couple said coarse adjustment circuit to each of the outputs of said pulse generating devices for coincidence comparison and in the absence thereof to operate said coarse synchronization adjustment, and parallel circuitry means to couple said fine adjustment circuit to each of the outputs of said pulse generating devices for coincidence comparison and in the absence thereof to operate said fine synchronization adjustment.

2. A system as described in claim 1, wherein said two-pulse check circuit comprises a relay, a relay control device conditioned to keep said relay deenergized so long as two of said position indicating pulses are detected, and circuitry means to couple a B+ power source through said relay to said coarse and fine adjustment circuits in order to cut-off said power source in the absence of said two pulse detection.

3. A system for synchronizing rotating elements comprising first and second rotating elements, a first and second synchronous motor to respectively drive said elements, said second motor having a rotor and a stator wherein said stator is rotatably adjustable, first and second position pulse generating devices responsive respectively to said first and second motor rotor positions in order to produce position indicative pulses thereof, a coarse synchronization adjustment circuit including a coarse adjustment relay, a resistance circuit connected to the field of said second motor through said coarse adjustment relay in order to cause a slipping operation of said second motor, circuitry means including a multivibrator conditioned to be responsive to a coincidence pulse of said position indicating pulses in order to cause the energization of said coarse adjustment relay and hence remove said resistance circuit from said field of said second synchronous motor and thus terminate the slipping operation, a fine adjustment circuit including a servo motor coupled to rotatably move said stator of said second synchronous motor, a polarized relay coupled to said servo motor through which the driving voltage is applied to said servo motor and which determines the direction of rotation of said servo motor, and circuitry means including a pair of clamp circuits and a fine adjustment relay control device conditioned to permit only the earlier of said position pulses which is characterized by noncoincidence with the other and positive polarity to pass and cause energization of said polarized relay hence permitting rotational direction intelligence to move and control said servo motor.

4. A system for synchronizing rotating elements comprising first and second rotating elements, a first and second synchronous motor to respectively drive said elements, said second motor having a rotor and a stator wherein said stator is rotatably adjustable, first and second position pulse generating devices responsive respectively to said first and second motor rotor positions in order to produce position indicative pulses thereof, a coarse synchronization adjustment circuit including a coarse adjustment relay, a resistance circuit connected to the field of said second motor through said coarse adjustment relay in order to cause a slipping operation, circuitry means including a multivibrator conditioned to be responsive to a coincidence pulse of said position indicating pulses in order to cause the eneregization of said coarse adjustment relay and hence remove said resistance circuit from said field of said second synchronous motor and thus terminate the slipping operation, a fine adjustment circuit including a servo motor coupled to rotatably move said stator of said second synchronous motor, a polarized relay coupled to said servo motor through which the driving voltage is applied to said servo motor and which determines the direction of rotation of said servo motor, and circuitry means including a pair of clamps and a relay control device so conditioned as to permit only the earlier of said position pulses which is characterized by noncoincidence with the other and positive polarity to pass and cause energization of said polarized relay hence permitting rotational direction intelligence to move and control said servo motor, a two-pulse check circuit comprising a two-pulse check relay, a two-pulse check relay control device so conditioned as to keep said two-pulse check relay deenergized so long as two of said positions indicating pulses are detected, and circuitry means to couple a B+ power source through said two-pulse check relay to said coarse and fine adjustment circuits in order to cutoff said power source in the absence of said two pulse detection.

5. A system for synchronizing rotating elements comprising first and second rotating elements, first and second synchronous motors to respectively drive said elements, said second motor having a rotor and a stator wherein the stator is rotatably adjustable, first and second position pulse generating devices responsive respectively to said first and second motor rotor positions in order to produce position indicative pulses thereof, a coarse synchronization adjustment circuit to effect slipping operation of said second motor, a fine synchronization adjustment circuit to effect rotatable adjustment of said stator, parallel circuitry means to couple said coarse adjustment circuit to each of the outputs of said pulse generating devices for coincidence comparison and in the absence thereof to operate said coarse synchronization adjustment, parallel circuitry means to couple said fine adjustment circuit to each of the outputs of said pulse generating device for coincidence comparison and in the absence thereof to operate said fine synchronization adjustment, said coarse adjustment circuit comprising a coarse adjustment relay, a resistance circuit connected into the field of said second synchronous motor through said coarse adjustment relay in order to cause a slipping operation and circuitry means including a multivibrator conditioned to be responsive to a coincidence pulse output from said parallel circuitry means in order to cause the energization of said coarse adjustment relay and hence remove said resistance circuit from said field of said second synchronous motor and thus terminate the slipping operation.

6. A system for synchronizing rotating elements comprising first and second rotating elements, first and second synchronous motors to respectively drive said elements, said second motor having a rotor and a stator wherein the stator is rotatably adjustable, first and second position pulse generating devices responsive respectively to said first and second motor rotor positions in order to produce position indicative pulses thereof, a coarse synchronization adjustment circuit to effect slipping operation of said second motor, a fine synchronization adjustment circuit to effect rotatable adjustment of said stator parallel circuitry means to couple said coarse adjustment circuit to each of the outputs of said pulse genereating device for coincidence comparison and in the absence thereof to operate said coarse synchronization adjustment, parallel circuitry means to couple said fine adjustment circuit to each of the outputs of said pulse generating device for coincidence comparison and in the absence thereof to operate said fine synchronization adjustment, said fine adjustment circuit comprising a servo motor coupled to rotationally move the stator of said second synchronous motor, a polarized relay coupled to said servo motor through which the driving voltage is supplied to said servo motor and which determines the direction rotation of said servo motor, and circuitry means including a pair of clamp circuits and a relay control device conditioned to permit only the earlier of said position pulses, which is characterized by non-coincidence with the other and positive polarity to pass and cause the energization of said relay, hence permitting rotational direction intelligence to control said servo motor.

7. A system for synchronizing rotating elements comprising first and second rotating elements, first and second synchronous motors to respectively drive said elements, said second motor having a rotor and a stator wherein the stator is rotatably adjustable, first and second position pulse generating devices responsive respectively to said first and second motor rotor positions in order to produce position indicative pulses thereof, a coarse synchronization adjustment circuit including means to effect a slipping operation of said second motor, a fine synchronization adjustment circuit to effect rotatable adjustment of said stator, parallel circuitry means to couple said coarse adjustment circuit to each of the outputs of said pulse generating device for coincidence comparison and in the absence thereof to operate said coarse synchronization adjustment and parallel circuitry means to couple said fine adjustment circuit to each of the outputs of said pulse generating device for coincidence comparison and in the absence thereof to operate said fine synchronization adjustment.

References Cited in the file of this patent

UNITED STATES PATENTS

| | | |
|---|---|---|
| 1,465,087 | Merrill | Aug. 14, 1923 |
| 1,527,637 | Fick | Feb. 24, 1925 |
| 2,228,079 | Gulliksen | Jan. 7, 1941 |
| 2,476,873 | Jeffers | July 19, 1949 |

FOREIGN PATENTS

| | | |
|---|---|---|
| 152,591 | Australia | July 30, 1953 |
| 983,568 | France | Feb. 14, 1951 |